United States Patent
Cole et al.

(10) Patent No.: US 8,514,749 B2
(45) Date of Patent: Aug. 20, 2013

(54) ROUTING REQUESTS FOR DUPLEX APPLICATIONS

(75) Inventors: Jonathan M. Cole, Woodinville, WA (US); Tomasz Janczuk, Redmond, WA (US); Nicholas A. Allen, Redmond, WA (US); Yavor Georgiev, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 12/721,356

(22) Filed: Mar. 10, 2010

(65) Prior Publication Data
US 2011/0222442 A1 Sep. 15, 2011

(51) Int. Cl.
*H04B 1/56* (2006.01)
*H04L 5/14* (2006.01)

(52) U.S. Cl.
USPC ........... 370/276; 370/275; 370/449; 370/278; 370/230; 370/395.31; 709/202; 709/203; 709/219; 709/229

(58) Field of Classification Search
USPC ................. 370/275, 276, 278, 235; 709/203, 709/217, 219, 229
See application file for complete search history.

(56) References Cited

U.S. PATENT DOCUMENTS

| | | | |
|---|---|---|---|
| 5,918,020 A | 6/1999 | Blackard et al. | |
| 5,987,611 A | 11/1999 | Freund | |
| 6,016,478 A | 1/2000 | Zhang et al. | |
| 6,035,324 A | 3/2000 | Chang | |
| 6,104,716 A | 8/2000 | Crichton | |
| 6,400,729 B1* | 6/2002 | Shimadoi et al. | 370/466 |
| 6,795,851 B1 | 9/2004 | Noy | |
| 7,003,616 B2 | 2/2006 | Shimura | |
| 7,117,267 B2 | 10/2006 | Bavadekar | |
| 7,835,309 B2* | 11/2010 | Allen et al. | 370/276 |
| 2002/0156927 A1 | 10/2002 | Boucher | |
| 2002/0174247 A1 | 11/2002 | Shen | |
| 2003/0069994 A1 | 4/2003 | Herceg et al. | |
| 2003/0217176 A1 | 11/2003 | Beunings | |
| 2004/0086100 A1 | 5/2004 | Moore et al. | |
| 2004/0216122 A1 | 10/2004 | Gram et al. | |
| 2005/0114442 A1* | 5/2005 | Hardwick et al. | 709/203 |

(Continued)

OTHER PUBLICATIONS

McRattan, Peter, "Silverlight 2 WCF Polling Duplex Support- Part 1: Architecture", Sep. 2008, 6 pages.

(Continued)

*Primary Examiner* — Hassan Kizou
*Assistant Examiner* — Deepa Belur
(74) *Attorney, Agent, or Firm* — Workman Nydegger

(57) ABSTRACT

The present invention extends to methods, systems, and computer program products for routing requests for duplex applications. Embodiments of the invention provide a multi-machine scalability mechanism for duplex messages patterns based on a polling mechanism. Client requests and polls can be distributed to service instances running within a cluster of machines by a session-unaware load balancer. Messages to and from a given client can be accessed by any service instance in the cluster service instance, which allows capacity scale-out and seamless failover between service instances. A coordinated inbound message store is used to affinitize application requests to a particular service instance. A coordinated outbound message store is used to route application responses from the machine running the application to the machine where a polling request arrived. Further, the lifetime of the service instance is decoupled from the inbound or outbound message stores, allowing the client-server conversation to potentially span many instances of the service.

18 Claims, 5 Drawing Sheets

(56) References Cited

U.S. PATENT DOCUMENTS

| | | |
|---|---|---|
| 2006/0174016 A1 | 8/2006 | Critchley |
| 2007/0112962 A1 | 5/2007 | Lewontin |
| 2008/0183842 A1 | 7/2008 | Raji |
| 2008/0195718 A1* | 8/2008 | Hu et al. .................. 709/207 |
| 2008/0205304 A1 | 8/2008 | Shivas et al. |
| 2008/0259797 A1* | 10/2008 | Gruper et al. ............. 370/235 |
| 2010/0074150 A1 | 3/2010 | Hersche et al. |
| 2011/0032847 A1 | 2/2011 | Allen |

OTHER PUBLICATIONS

Wahlin, Dan, "Pushing Data to a Silverlight Client with a WCF Duplex Service- Part II", 2008, 11 pages.
Esenther, Alan W., "Instant Co-Browsing" Lightweight Real-time Collaborative Web Browsing, 2002, 4 pages.
Regnier, Greg, "CSP: A System-Level Architecture for Scalable Communication Services", Intel Technology Journal Q2, May 2001, 6 pages.
Berg, Pal, "Asynchronous and full duplex communication over HTTP", mBricks, May 2008, 4 pages.
Yong, Hee, et al., "The Approaches for High Available and Fault-Tolerant Cluster Systems", FTCC 2000, May 2000, 11 pages.
U.S. Appl. No. 12/336,233, mailed Sep. 13, 2010, Notice of Allowance.
Office action dated Nov. 8, 2012 cited in U.S. Appl. No. 12/906,337.
Notice of Allowance dated May 20, 2013 cited in U.S. Appl. No. 12/906,337.

* cited by examiner

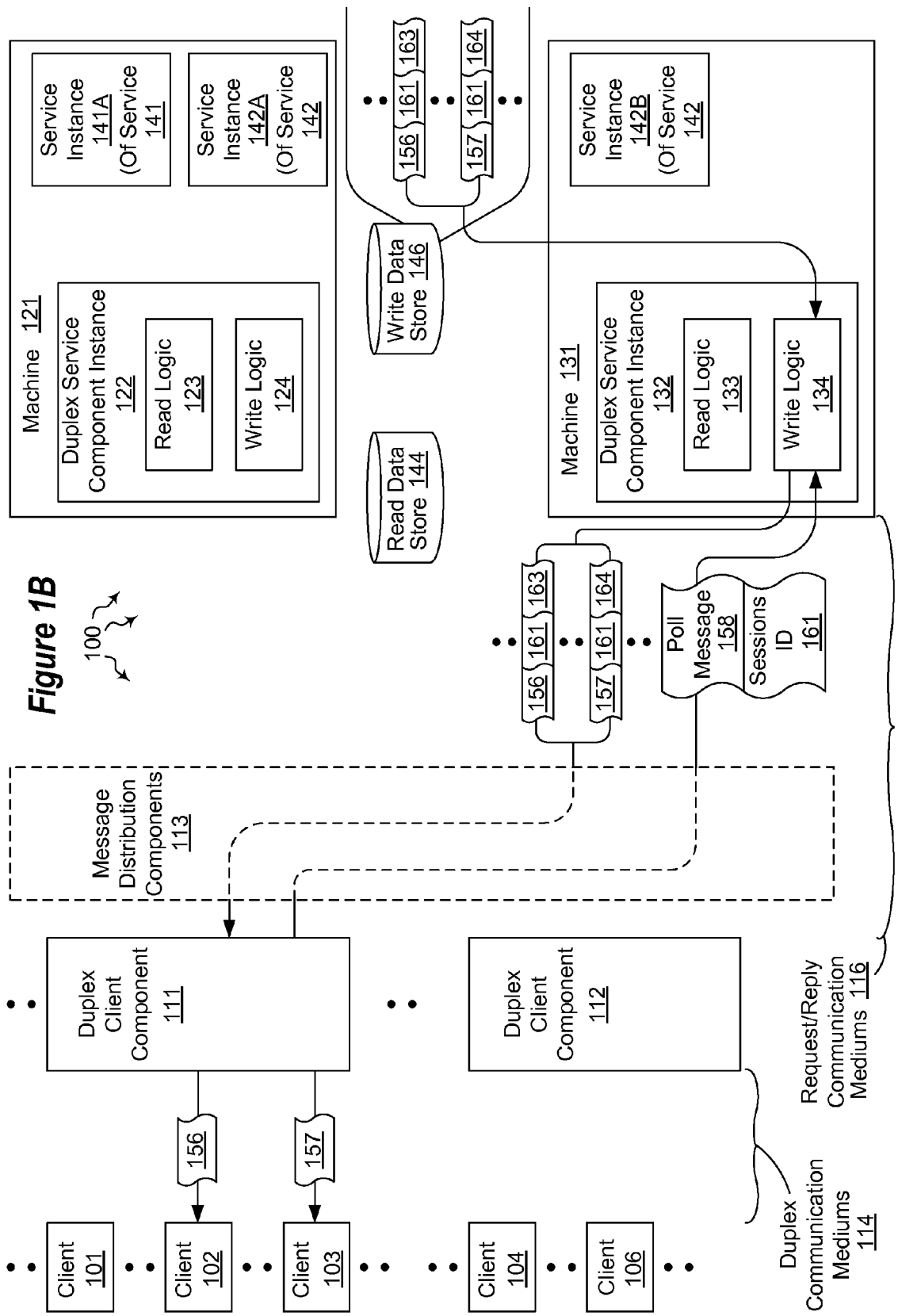

ROUTING REQUESTS FOR DUPLEX APPLICATIONS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

On many networks, such as, the Internet, HyperText Transfer Protocol ("HTTP") is the prevalent communication medium used to exchange electronic data. A significant number of network connected personal computers have general purposed libraries and client programs, such as, for example, Web browsers, for executing HTTP applications. Thus, network and systems administrators typically permit HTTP traffic, often with little or no filtering restrictions, to a far greater degree than most other protocols. This combination of near universal compatibility and increased access gives HTTP a tremendous reach for establishing connections and exchanging information between two systems.

However, HTTP is bound to a particular request-reply message exchange pattern that limits initiation of message exchanges to one side and permits only one reply for any given message by the other side. Frequently, there are limitations applied to the number of simultaneous HTTP connections and the length of use of an HTTP connection outside of the control of the application developer. There are many common application patterns that require exchanging messages in an unrestricted bidirectional fashion, sometimes with long gaps between message exchanges and with unbalanced numbers of exchanges between the client and server.

To work around the various limitations of HTTP, some techniques rely on a client making periodic background "polling" HTTP connections to a server. The server can then use the HTTP response of these connections to transmit data back to the client. Since polling happens in the background of the application, these techniques create the functional equivalent of the server's ability to asynchronously send messages to the client.

However, When implementing server-side logic to handle polling-based HTTP message patterns, a server can run out of physical resources due to the number and frequency of HTTP polls that a large number of simultaneously connected clients can generate. Thus, although polling techniques allow bi-directional connectivity, the polling techniques also generate significantly more simultaneous connections than a regular request/reply pattern. Although resources at an individual computer system can be increased to some extent to compensate, there is a limit to the improvement that can be made to the hardware specifications of a single server. Accordingly, when client load sufficiently increases, the client load will need to be distributed among multiple servers, using a network load balancer.

BRIEF SUMMARY

The present invention extends to methods, systems, and computer program products for routing requests for duplex applications. In some embodiments, messages are stored for access by designated service instances. A duplex service component receives a message from a duplex client component. The message is sent from a client in duplex communication with the duplex client component and routed from the duplex client component to the duplex service component using a request/reply protocol. The message has a session ID corresponding to the duplex client component and has an endpoint ID corresponding to the client.

The duplex service component determines that a designated service instance for the message is not available at the duplex service component. The duplex service component stores the message in a read data store in response to the determination. Accordingly, through access to the read data store, the message is made available to a designated service instance at another duplex service component. The message is grouped with other messages by session ID and endpoint ID such that messages from the same clients are grouped together within the read data store.

A designated service instance at a second duplex service component uses duplex communication to access the message from the client. The designated service instance accesses the message based on the message having a session ID and endpoint ID corresponding to the duplex client component and the client respectively.

In other embodiments, one or more application messages are delivered to a client. A duplex service component receives a poll message from a duplex client component. The duplex service component is one of one or more duplex service components. The poll message includes a session ID assigned to the duplex client component and requests application messages for one or more clients that are in duplex communication with the duplex client component. The poll message is routed from the duplex client component to the duplex service component using a request/reply protocol.

The duplex service component checks a write data store for any application messages having the session ID assigned to the duplex client component. The duplex service component locates in the write data store at least one application message having the session ID assigned to the duplex client component. The at least one message was written to the write data store by a first service instance using duplex communication. The first service instance available at a first duplex service component also included in the one or more duplex service components. The duplex service component sends the application message to the duplex client component using the request/reply protocol.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 1A and 1B illustrate an example computer architecture that facilitates routing messages between clients and designated service instances.

DETAILED DESCRIPTION

Figure 1A:
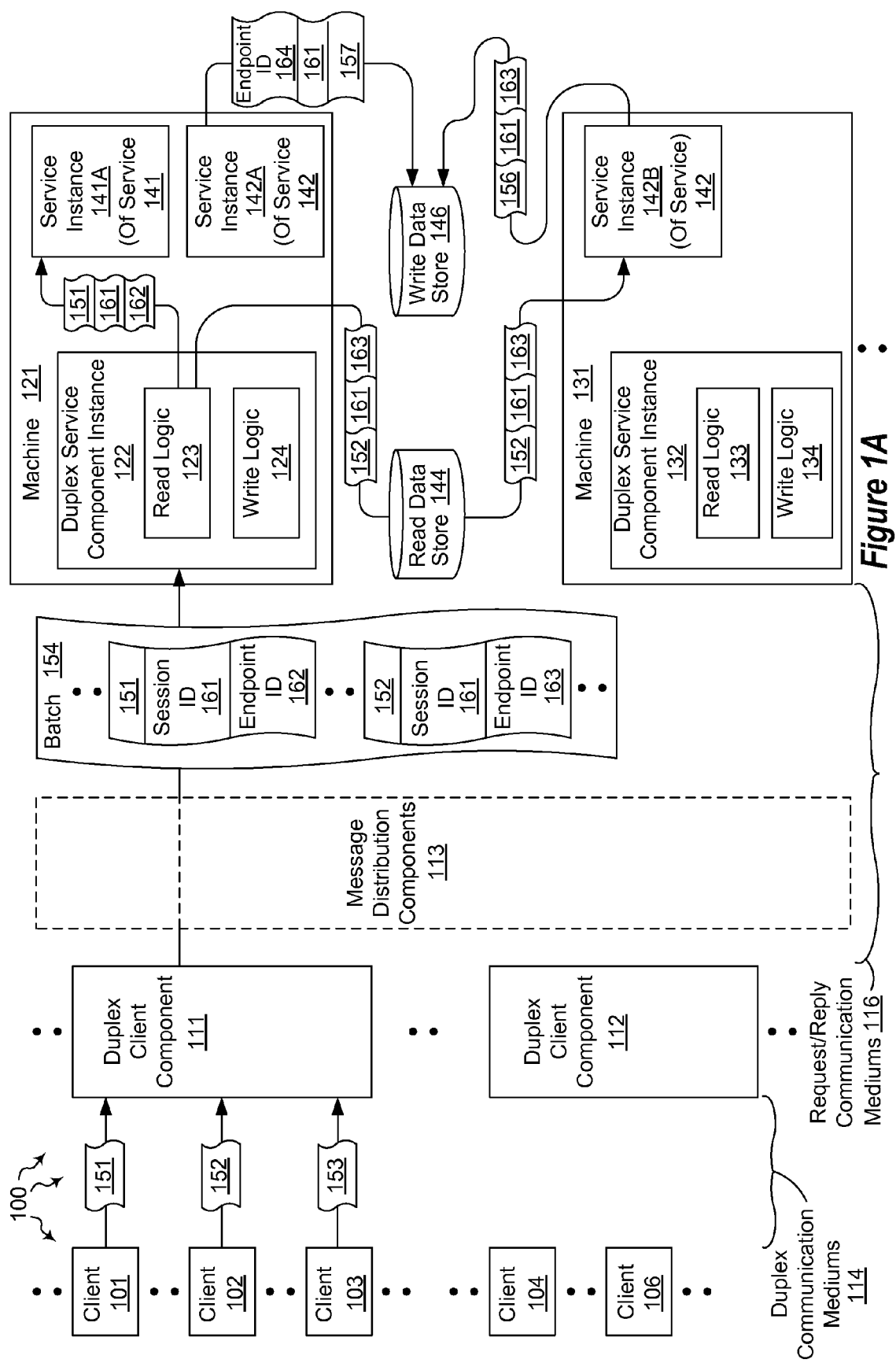

The present invention extends to methods, systems, and computer program products for routing requests for duplex applications. In some embodiments, messages are stored for access by designated service instances. A duplex service component receives a message from a duplex client component. The message is sent from a client in duplex communication with the duplex client component and routed from the duplex client component to the duplex service component using a request/reply protocol. The message has a session ID corresponding to the duplex client component and has an endpoint ID corresponding to the client.

The duplex service component determines that a designated service instance for the message is not available at the duplex service component. The duplex service component stores the message in a read data store in response to the determination. Accordingly, through access to the read data store, the message is made available to a designated service instance at another duplex service component. The message is grouped with other messages by session ID and endpoint ID such that messages from the same clients are grouped together within the read data store.

A designated service instance at a second duplex service component uses duplex communication to access the message from the client. The designated service instance accesses the message based on the message having a session ID and endpoint ID corresponding to the duplex client component and the client respectively.

In other embodiments, one or more application messages are delivered to a client. A duplex service component receives a poll message from a duplex client component. The duplex service component is one of one or more duplex service components. The poll message includes a session ID assigned to the duplex client component and requests application messages for one or more clients that are in duplex communication with the duplex client component. The poll message is routed from the duplex client component to the duplex service component using a request/reply protocol.

The duplex service component checks a write data store for any application messages having the session ID assigned to the duplex client component. The duplex service component locates in the write data store at least one application message having the session ID assigned to the duplex client component. The at least one message was written to the write data store by a first service instance using duplex communication. The first service instance available at a first duplex service component also included in the one or more duplex service components. The duplex service component sends the application message to the duplex client component using the request/reply protocol.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and in the following claims, a "duplex communication medium" is a defined as a communication medium between two connected parties that permits communication in both directions between the parties and wherein either party can independently initiate communication to the other party across the communication medium. Duplex communication medium is defined to include both half duplex communication mediums (one party sends and another party receives at a time) and full duplex communication mediums (both parties are permitted to simultaneously send and receive).

In this description and in the following claims, a "request/reply communication medium" is defined as a communication medium between two connected parties that permits (potentially exactly) paired communication between the parties. A requestor (e.g., client) sends a request message to a replier system (e.g., server) which receives and processes the request, ultimately returning a message in response. Request/reply can be implemented in a synchronous or asynchronous manner. HyperText Transfer Protocol ("HTTP") is an example of a request/reply communication medium.

FIGS. 1A and 1B illustrate an example computer architecture 100 that facilitates routing messages between clients and designated service instances. As depicted, computer architecture 100 includes clients 101, 102, 103, 104, and 106, duplex client components 111 and 112, message distribution components 113, machines 121 and 131, read data store 144, and write data store 146. Each of the components and machines depicted in computer architecture 100 is connected to one another over (or is part of) a network, such as, for example, a Local Area Network ("LAN"), a Wide Area Network ("WAN"), and even the Internet. Accordingly, each of the depicted components and machines as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Different components within computer architecture 100 can be connected to one another via different types of communication mediums, including duplex communication mediums and request/reply communication mediums. For example, duplex communication mediums 114 connect clients 101, 102, and 103 to duplex client component 111 and connected clients 104 and 106 to duplex client component 112. Duplex communication mediums 114 can include network communication mediums as well as system bus communication mediums. Request/reply communication mediums 116 (e.g., HTTP) connect duplex client components 111 and 112 to machines 121 and 131 (and thus to duplex service components 122 and 132 respectively). Within machine 121, duplex communication mediums (not shown) connect duplex service component instance 122 to service instances 141A and 142A. Similarly, within machine 131, duplex communication mediums (not shown) connect duplex service component instance 132 to service instances 142B.

Different communication mediums can be located on portions of different networks. For example, duplex communications mediums 114 can be located on a corporate LAN or WAN under the control of a one or more different corporations. Request/reply communication mediums 116 can be located on a public WAN, such as, for example, the Internet. Duplex communications at machines 121 and 131 can be located on a service provider LAN or WAN under the control of one or more different service providers. Accordingly, clients 101, 102, 103, 104, and 106 can be computer systems that from time to time send requests to services instances at machines 121 and 131.

Each of clients 101, 102, 103, 104, and 106 as well as other clients represented by the ellipsis in computer architecture 100 (hereinafter occasionally referred to as "clients") can be under the control of the same or different entities. Clients in be client applications, such as, for example, Web browsers or Web service components. Generally, duplex communication mediums 114 connect a client to a corresponding duplex client component, each of which can be under the control of the same or different entities. Thus, clients can send messages to and receive messages from duplex client components (e.g., 111 and 112) over duplex communication mediums 114.

Each duplex client component, including duplex client component 111 and duplex client component 112, is configured to receive messages from and send messages to clients over duplex communication mediums 114. Each of the duplex client components are also configured to send requests to duplex service component instances (e.g., 122 and 132) over request/reply communication mediums 116 and to receive corresponding replies from duplex service components over request/reply communication mediums 116. As such, duplex client components are also generally configured to appropriately convert between duplex communication and request/reply communication.

Similar to clients, duplex client components can be under the control of the same or different entities. In some embodiments, one or more clients and a duplex client component are under the control of the same entity. For example, clients 101, 102 and 103 and duplex client component 111 can be under the control of the same first entity. For example, duplex client component 111 could be hosted in a web browser process and clients 101, 102, and 103 could be controls hosted in a web page displayed by the web browser. Similarly, clients 104 and 106 and duplex client component 112 can be under the control of the same second entity (that is different than the first entity). Alternately, a duplex client component can be under the control of one entity that is configured to process messages for the clients of one or more different other entities. For example, clients 101, 102, 103, and duplex client component 111 can each be under the control of a different entity.

Message distribution components 113 provide a mechanism for distributing messages from duplex client components to duplex service component instances. Message distribution components 113 can include, for example, a load balancer, domain name system ("DNS") resolution components, a router, etc. Message distribution components 113 can use an algorithm (e.g., round robin) that distributes messages without any session affinity.

Thus, message distribution components 113 can distribute different messages from the same client to different duplex client service instances. For example, message distribution components 113 can route a first message from client 101 to duplex service component instance 122 and route a second message from client 101 to duplex service component instance 132 (or to a duplex service component instance at some other machine). Likewise, message distribution components 113 can distribute messages from different clients to the same duplex service component instance. For example, message distribution components 113 can route a message from client 103 and a message from client 106 to duplex service component instance 132.

Generally, duplex service component instances are configured to receive requests from duplex client components over request/reply communication mediums and to send replies to duplex client components over request/reply communication mediums. For example, duplex service instances 122 and 132 can receive requests from and send replies to any of clients 101, 102, 103, 104, and 106 over request/reply communication mediums 116. Duplex service component instances are also configured to receive messages from and send messages to service instances over duplex communication mediums. For example, duplex service component instance 122 can receive messages from and send messages to service instances 141A and 142A (and other service instances at machine 121) over duplex communication at machine 121. Similarly, duplex service component instance 132 can receive messages from and send messages to service instance 142B (and other service instances at machine 131) over duplex communication at machine 131. As such, duplex service component instances are also generally configured to appropriately convert between duplex communication and request/reply communication.

Generally, a service instance is an instance of a service run at a machine. For example, service instance 141A (of service 141) is run at machine 121. Different service instances of a service can also run at different machines. For example, service instance 142A and 142B (of service 142) are run at machines 121 and 131 respectively. Different service instances can be under the control of the same or different entities. Services instances can be service applications, such as, for example, Web servers or Web service components. Duplex communication mediums between a service instances and machines can also be under the control of the same or different entities. As such, services instances 141A, 142A, and 142B (as well as any other service instances at machines 121 and 131 as well as services instances at other machines) can send messages to and receive messages from corresponding duplex service component instances over duplex communication mediums.

When exchanging messages, a duplex client component can attach a session ID identifying the duplex client component. For example, when sending message 151, duplex client component 111 can attach session ID 161 to message 151. Session ID 161 can identify duplex client component 111 as the sender of message 151. Duplex service component instances and service instances can use a session ID to identify the originating duplex client component for a received message. For example, duplex service component instance 122 can use session ID 161 to identify duplex client component 111 as the sender of message 151.

When a duplex client component sends a message, the duplex client component can also attach an endpoint ID identifying a client. For example, when sending message 152, duplex client component 111 can also attach endpoint ID 163 to message 152. Endpoint ID 163 can identify client 102 as the client that sent message 152 to duplex client component 111.

In some embodiments, duplex client components batch messages prior to sending. For example, duplex client component 111 can batch messages 151, 152, etc, in batch 154. Duplex client component 111 can then send batch 154, including messages 151, 152, etc., to a duplex service component instance. Sending batches conserves resources relative to sending messages individually.

An endpoint ID can travel along with a message and be transferred to any corresponding response message for return to a duplex client component. Referring momentarily to FIG. 1B, duplex service component 132 can send message 154 along with session ID 161 and endpoint ID 163 to duplex client component 111. When duplex client component 111 receives message 156, duplex client component 111 uses endpoint ID 163 to determine that message 156 is to be delivered to client 102.

In some embodiments, duplex service component instances batch messages for the same duplex client together prior to sending.

Duplex service component instances can include read logic and write logic that assist in routing incoming request messages to the appropriate service instance and routing outgoing reply messages to the appropriate duplex client component. For example, turning back to FIG. 1A, duplex service instance 122 includes read logic 123 and write logic 124. Similarly, duplex service instance 132 includes read logic 133 and write logic 134

Generally, read data store 144 is configured to hold request (application) messages until a responsible service instance requests the request (application) messages. Read data store 144 can be some type of durable storage, permitting request (application) messages to be more permanently preserved until requested by a responsible service instance. Read data store 144 can be globally accessible to duplex service component instances and service instances. Thus, a duplex service component instance at one machine can store a request (application) message in read data store 144 to make the request (application) message available to service instances at other machines.

Thus, when a duplex service component instance receives an application message (or batch of application messages), the read logic can analyze the message (or each individual message) to determine if a service instance at the same machine is responsible for the message. The analysis can include determining if a service instance at the same machine is processing other messages for the same attached session ID. When a service instance at the same machine is processing other messages for the same attached session ID, the read logic can route the message to the service instance. On the other hand, when a service instance at the same machine is not processing other messages for the same attached session ID, the read logic routes the message to read data store 144.

When a service instance is responsible for a session ID, the service instance can (e.g., from time to time or in response to receiving other messages for the session ID) query read data store 144 for messages having the attached session ID. Thus, a message received at a duplex component service instance at one machine can be stored at read data store 144 and subsequently accessed by a responsible service instance at another machine.

Generally, write data store 146 is configured to hold reply (application) messages received from service instances until requests (polls) for the reply (application) messages are received from duplex client components. Write data store 146 can be some type of durable storage, permitting reply (application) messages to be more permanently preserved until returned (e.g., in response to a poll message) to an appropriate duplex client component. Write data store 146 can be globally accessible to duplex service component instances and service instances. Thus, a service instance at one machine can store a reply (application) message in read data store 146 to make the reply (application) message available to duplex service component instances at other machines.

Figure 2:
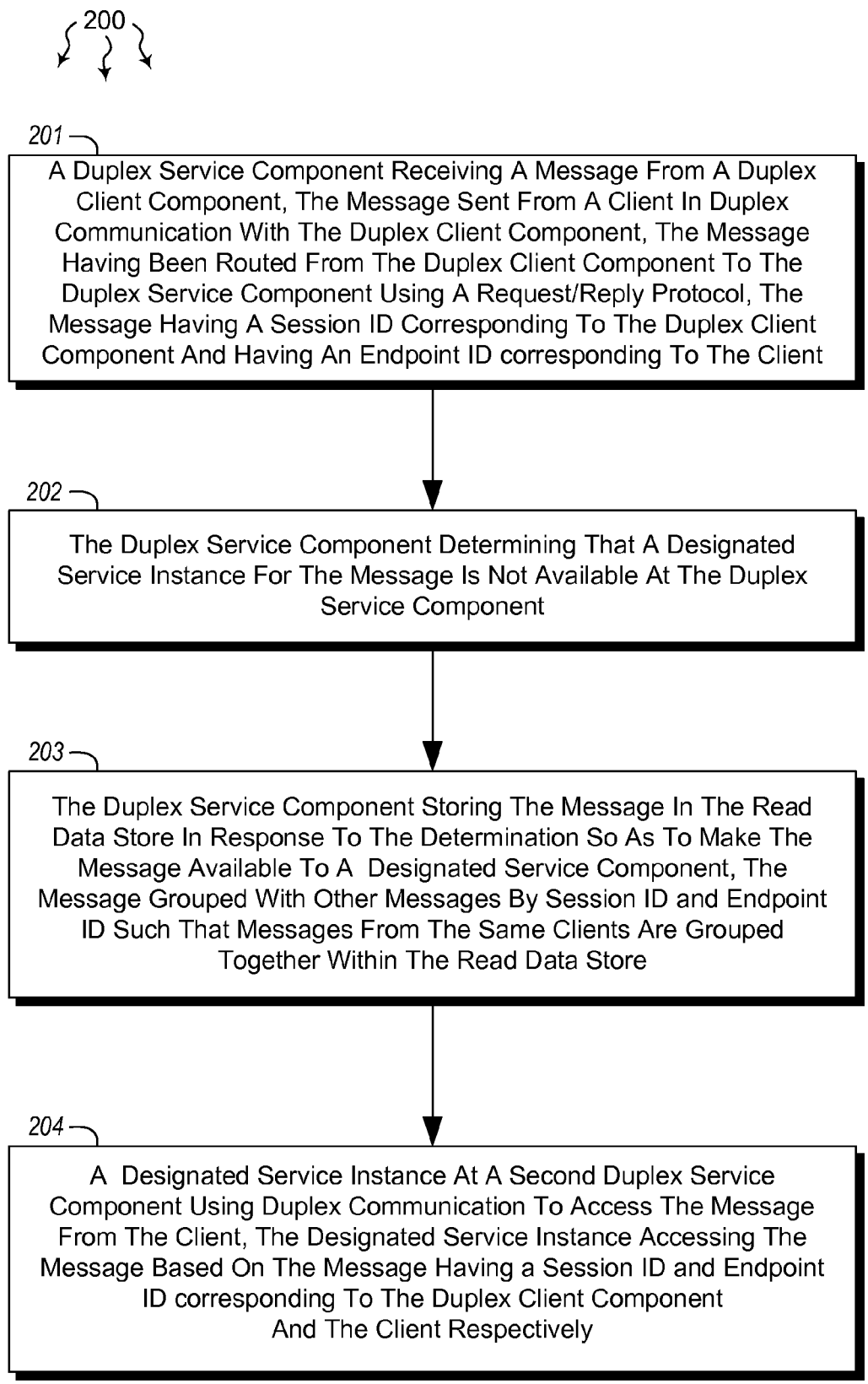
FIG. 2 illustrates a flow chart of an example method for storing messages for access by designated service instances

FIG. 2 illustrates a flow chart of an example method 200 for storing messages for access by designated service instances. Method 200 will be described with respect to the components and data depicted in FIG. 1A.

Method 200 includes an act of a duplex service component receiving a message from the duplex client component, the message sent from a client in duplex communication with the duplex client component, the message having been routed from the duplex client component to the duplex service component using a request/reply protocol, the message having a session ID corresponding to the duplex client component and having an endpoint ID corresponding to the client (act 201). For example, duplex service component instance 122 can receive message 152 from duplex client component 111. As depicted in FIG. 1A, message 152 is sent from client 102 to duplex client component 111 over duplex communication mediums 114. Message 152 was routed from duplex client component 111 to duplex service component instance 122 over request/reply communication mediums 116 (e.g., HTTP). Message distribution components 113 can route message 152 to duplex service component instance 122 without any regard for session affinity. Thus, message 152 could just as well have been routed to duplex service component instance 132 or some other duplex service component instance (e.g., at some other machine). Message 152 includes session ID 161 corresponding to duplex client component 111 and endpoint ID 163 corresponding to client 102.

As depicted, message 152 can be included along with other messages (e.g., message 151) in batch 154. Each message in batch 154 can include session ID 161 and an endpoint ID corresponding to a client in duplex communication with duplex client component 111. Thus, it may be that duplex service component instance 122 receives batch 154 and subsequently accesses individual messages from within batch 154.

Other request (application) messages from other duplex client components and clients can also be grouped by session ID and endpoint ID and stored in read data store 144 for access by a designated service instance. Messages from other duplex client components and clients can be grouped and stored when the designated service instance is not available at a duplex service component instance that receives the request (application) messages. For example, a request (application) message for duplex client component 112 and a connected client (e.g., 104 and 106) can also be stored in write data store 146, when a designated service instance is not available to process the request (application) message at the same machine.

Method 200 includes an act of the duplex service component determining that a designated service instance for the message is not available at the duplex service component (act 202). For example, read logic 123 can determine that a designated service instance for message 152 is not available at machine 121. The determination of non-availability can include determining that a service instance responsible for messages corresponding to a combination of session ID and/or endpoint ID is not available at the duplex service component. For example, read logic 123 can determine that a service instance responsible for messages corresponding to a combination of session ID 161 and endpoint ID 163 is not available at machines 121.

Read logic 123 can also determine that a designated service instance for a message is available at machines 121. For example, read logic 123 can determine that service instance 141A is a designated service instance for message 151. The determination of availability can include determining that a service instance responsible for messages corresponding to a combination of session ID and/or endpoint ID is available at the duplex service component. For example, read logic 123 can determine that service instance 141A is responsible for messages corresponding to a combination of session ID 161 and endpoint ID 162.

Method 200 includes an act of the duplex service component storing the message in the read data store in response to the determination so as to make the message available to a designated service instance at another duplex service component, the message grouped with other messages by session ID and endpoint ID such that messages from the same clients are grouped together within the read data store (act 203). For example, in response to determining that a designated service instance for message 152 is not available at machine 121, read logic 123 can store message 152 (along with session ID 161 and endpoint ID 163) in read data store 144. Within read data store 144, message 152 is grouped together with other messages having session ID 161 and endpoint ID 162 (i.e., other messages from client 102). Storing message 152 in read data store 144 makes message 152 available to service instances at other duplex service component instances (e.g., at machine 131).

Method 200 includes an act of an act of a designated service instance at a second duplex service component using duplex communication to access the message from the client, the designated service instance accessing the message based on the message having a session ID and endpoint ID corresponding to the duplex client component and the client respectively (act 204). For example, service instance 142B can access message 152 (along with session ID 161 and endpoint ID 163) from read data store 144 using duplex communication. That is, service instance 142B access message 152 based on being designated to process application messages sent from the combination of duplex client component 111 and client 102.

Upon processing message 152, it may be that service instance 142B has results to return to client 102. Service instance 142B can store the results in a message in write data store 146. For example, service instance 142B can store message 156, containing the results of processing message 152, (along with session ID 161 and endpoint ID 163) in write data store 146 using duplex communication. In response to a request (poll) message for reply (application) messages for duplex client component 111, write logic at a duplex service component instance can access message 156 and return message 156 to duplex client component 111.

Other service instances can also store messages in write data store 146 using duplex communication. For example, in response to processing a request (application) message from client 103, service instance 142A can store message 157 along with session ID 161 and endpoint ID 164. Endpoint ID 164 can be the endpoint ID that duplex client component 111 assigned to client 103.

Other reply (application) messages for return to other duplex client components and clients can also be grouped together by session ID and endpoint ID and stored in write store 146. For example, reply (application) messages for duplex client component 112 and clients (e.g., 104 and 106) can also be stored in write data store 146.

Figure 3:
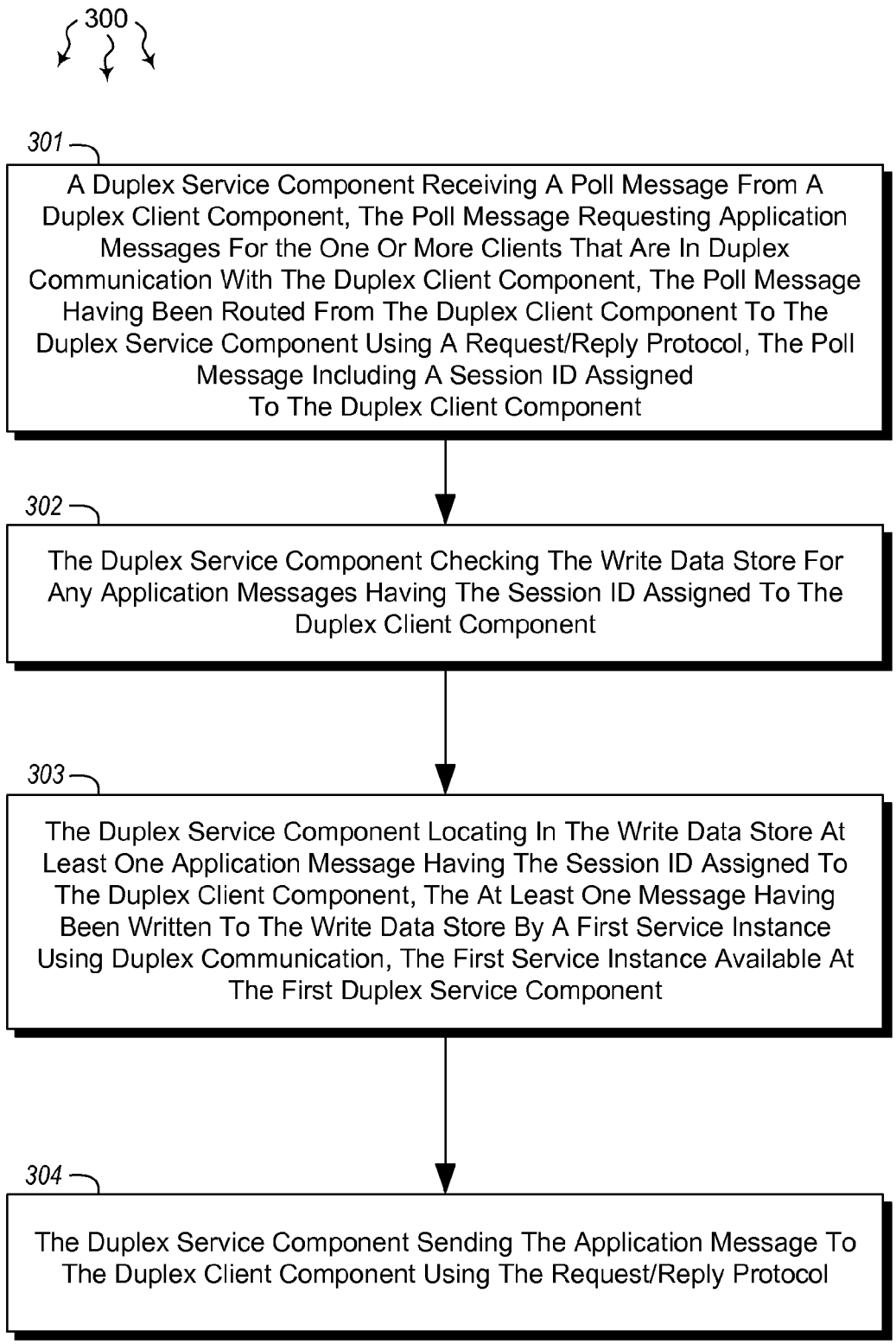
FIG. 3 illustrates a flow chart of an example method for delivering application messages to a client.

FIG. 3 illustrates a flow chart of an example method 300 for delivering application messages to a client. Method 300 will be described with respect to the components and data depicted in FIG. 1B.

Method 300 includes an act of a duplex service component receiving a poll message from the duplex client component, the poll message requesting application messages for the one or more clients that are in duplex communication with the duplex client component, the poll message having been routed from the duplex client component to the duplex service component using a request/reply protocol, the poll message including a session ID assigned to the duplex client component (act 301). For example, duplex component instance 132 can receive poll message 158 along with session ID 161 from duplex client component 111. Thus, poll message 158 requests reply (application) messages for clients (including 101, 102, and 103) in duplex communication with duplex client component 111. Poll message 158 was routed from duplex client component 111 to duplex service component instance 132 over request/reply communication mediums 116 (e.g., HTTP). Message distribution components 113 can route poll message 158 to duplex service component instance 132 without any regard for session affinity.

Method 300 includes an act of the duplex service component checking the write data store for any application messages having the session ID assigned to the duplex client component (act 302). For example, duplex component instance 132 can check write data store 146 for any reply (application) messages grouped together by session ID 161.

Method 300 an act of the duplex service component locating in the write data store at least one application message having the session ID assigned to the duplex client component, the at least one message having been written to the write data store by a first service instance using duplex communication, the first service instance available at the first duplex service component (act 303). For example, upon checking write data store 146, duplex service component instance 132 can locate at least message 157 having session ID 161, which was written to write data store 146 by service instance 142A using duplex communication. Duplex component service component instance 132 can also locate message 156, which was written to write data store 146 by service instance 142B using duplex communication.

Method 300 includes an act of the duplex service component sending the application message to the duplex client component using the request/reply protocol (act 304). For example, write logic 134 can send message 157 along with endpoint ID 164 to duplex client component 111 using request/replay communication mediums 116 (e.g., HTTP). Write logic 134 can also send message 156 along with endpoint ID 163 to duplex client component 111 using request/replay communication mediums 116. In some embodiments, messages 156 and 157 are batched along with other messages for delivery duplex client component 111. Write logic 134 then sends the batch of messages to duplex client component 111. Write logic 134 may or may not include session ID 161 in return messages 156 and 157, since it is already aware of session ID 161 from poll message 158.

Upon receiving (e.g., a batch) one or more messages, duplex client component 111 can use endpoint IDs to delivery individual messages to appropriate clients. For example, based on session IDs 163 and 164, duplex client component 111 can deliver messages 156 and 157 to clients 102 and 103 respectively.

Figure 4:
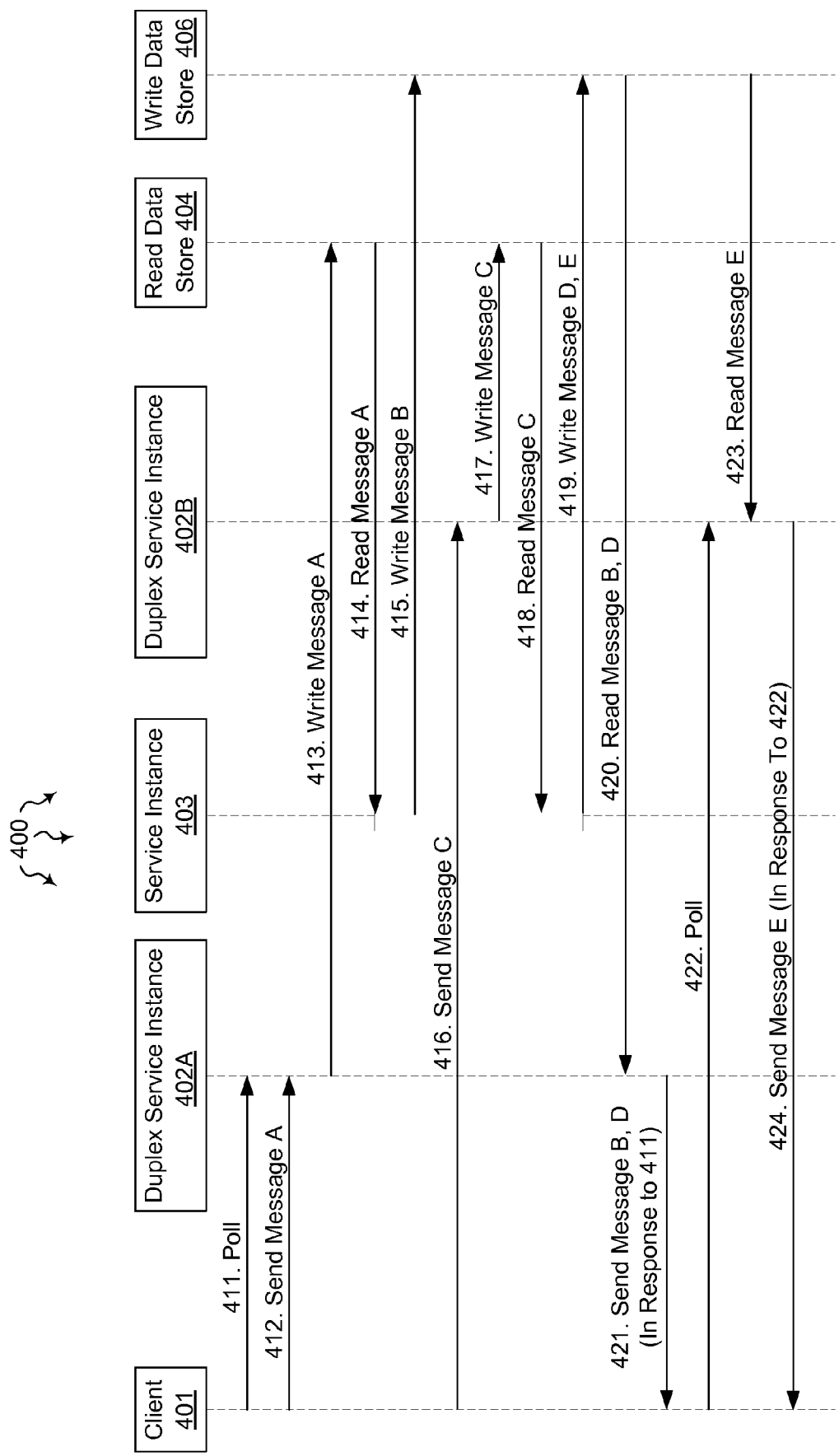
FIG. 4 illustrates an example message flow pattern for routing messages between clients and designated service instances.

FIG. 4 illustrates an example message flow pattern 400 for routing messages between clients and designated service instances. Arrow 411 represents client 401 establishing a poll, which is routed to duplex service instance 402A based on an algorithm that routes messages (potentially randomly) with no session affinity. The poll allows duplex service instance 402A to query write data store 406 and deliver messages for client 401 at any time.

Arrow 412 represents client 401 sending request (application) message A, which is also routed to duplex service instance 402A based on the algorithm that routes messages (potentially randomly) with no session affinity. Arrow 413 represents duplex service instance 402A writing message A to read data store 404. Duplex service instance 402A can write message A to read data store 404 in response to the designated service instance (e.g., 403) not being available at the same machine as duplex service instance 402A. Arrow 414 represents service instance 403 (the designated service instance for client 401) checking read data store 404 and locating message A. Service instance 403 reads message A triggering an activation of service instance 403, which carries out some processing.

Arrow 415 represents service instance 403 (during the processing of message A) opting to send message B to client 401 by storing message B in write data store 406. Arrow 416 represents client 401 sending request (application) message C, which is also routed to duplex service instance 402B based on the algorithm that routes messages (potentially randomly) with no session affinity. Arrow 417 represents duplex service instance 402B writing message C to read data store 404. Duplex service instance 402B can write message C to read data store 404 in response to the designated service instance (e.g., 403) not being available at the same machine as duplex service instance 402B.

Arrow 418 represents service instance 403 still being active, checking read data store 404, and locating message C. Service instance 403 reads message C from read data store 404 and continues processing. Arrow 419 represents service instance 403 completing processing and sending messages D and E to client 401 by storing messages D and E in write data store 406. Arrow 420 represents duplex service instance 402A, based on some transport-specific logic, deciding to access messages B and D from write data store 406 and send messages B and D to client 401. Duplex service instance 402A is able to send messages B and D since it still has the poll represented in arrow 411. Arrow 421 represents duplex service instance 402A sending messages B and D to client 401 in response to the poll represented in arrow 411.

Arrow 422 represents Duplex service instance 402B receiving a subsequent poll from client 401. The subsequent poll is routed to duplex service instance 402B based on the algorithm that routes messages (potentially randomly) with no session affinity. The poll allows duplex service instance 402B to query write data store 406 and deliver messages for client 401 at any time. Arrow 423 represents duplex service instance 402B, based on some transport-specific logic, deciding to send remaining messages, message E, from write data store 406 to client 401. Duplex service instance 402B is able to send message E since duplex client 402B has the poll represented in arrow 422. Arrow 423 represents duplex service instance 402B sending message E to client 401 in response to the poll represented in arrow 422.

Accordingly, embodiments of the invention provide a multi-machine scalability mechanism for duplex messages patterns based on a polling mechanism. Client requests and polls can be distributed to service instances running within a cluster of machines by a session-unaware load balancer. Messages to and from a given client can be accessed by any service instance in the cluster service instance, which allows capacity scale-out and seamless failover between service instances.

Embodiments include support for multiplexed duplex communication over a non-natively duplex communication medium where the client and server systems are separated by session-unaware load-balancing. A coordinated inbound message store (e.g., read data store 144) is used to affinitize application requests to a particular service instance. A coordinated outbound message store (e.g., write data store 146) is used to route application responses from the machine running the application to the machine at which a polling request arrived. Further, the lifetime of the service instance is decoupled from the inbound or outbound message stores, allowing the client-server conversation to potentially span many instances of the service.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented in a computing environment that includes a duplex client component that is connected to one or more clients using a duplex communications medium, a first and a second computer system that are each connected to at least one duplex client component using a request/reply communications medium and that each include a corresponding duplex service component and a corresponding service instance, and a read data store that is accessible to each of the first and second computer systems, a method for storing messages for access by service instances, the method comprising:

an act of receiving, at a first duplex service component of the first computer system, a message from the duplex client component, the message having been sent from a client of the one or more clients to the duplex client component using a duplex communication protocol, and having been routed from the duplex client component to the first duplex service component using a request/reply communication protocol, the duplex client component having converted the message for request/reply communication, including attaching a session ID corresponding to the duplex client component to the message and attaching an endpoint ID corresponding to the client to the message;

an act of the first duplex service component determining that a first service instance of the first computer system is not processing messages with the attached session ID, and that the message is therefore not intended for the first service instance; and an act of the first duplex service component storing the message in the read data store in response to the determination, so as to make the message available to another service instance at another computer system, the message being grouped in the read data store with other messages having the same session ID and endpoint ID, such that messages from the same clients are grouped together within the read data store;

wherein a second service instance of the second computer system accesses the message from the read data store, the second service instance accessing the message based on the message having a session ID and endpoint ID corresponding to the duplex client component and the client, respectively.

2. The method as recited in claim 1, further comprising:

an act of receiving at the first duplex service component a second message from the duplex client component, the second message having been sent from a second client to the duplex client component using a duplex communication protocol and having been routed from the duplex client component to the first duplex service component using a request/reply communication protocol, the duplex client component having converted the second message for request/reply communication including attaching the session ID corresponding to the duplex client component to the second message and attaching a second endpoint ID corresponding to the second client to the second message.

3. The method as recited in claim 2, wherein the act of receiving at the first duplex service component a message from the duplex client component and the act of receiving at the first duplex service component a second message from the duplex client component comprise an act of the first duplex service component receiving a batch of messages from the duplex client component, the batch of messages including a plurality of individual messages including the message and the second message, the plurality of individual messages sent from the one or more clients in duplex communication with the duplex client component, including the client and the second client, each message in the plurality messages, including the message, having the session ID corresponding to the duplex client component.

4. The method as recited in claim 3, further comprising:

an act of the first duplex service component breaking apart the batch of messages into the plurality of individual messages.

5. The method as recited in claim 4, wherein the act of the first duplex service component determining that the first service instance of the first computer system is not processing messages with the attached session ID, and that the message is therefore not intended for the first service instance comprises an act of the first duplex service component determining that the first service instance for at least some of the individual messages in the plurality of individual messages is not available at the first computer system.

6. The method as recited in claim 5, wherein the act of the first duplex service component storing the message in the read data store comprises an act of the first duplex service component storing at least some of the one or more individual messages in the read data store in response to the determination so as to make the at least some of the one or more individual messages available to designated service instances at other computer systems, the individual messages grouped by session ID and endpoint ID such that messages from the same clients are grouped together within the read data store.

7. The method as recited in claim 2, further comprising:

an act of the first duplex service component determining that another service instance for the second message is available at the first computer system; and an act of the first duplex service component in response to the determination providing the second message to the other designated service instance at the first computer system without storing the second message in the read data store.

8. The method as recited in claim 1, wherein the computing environment includes a write data store, and wherein:
the second service instance at the second duplex service component processes the message subsequent to the second service instance at the second duplex service component accessing the message;
the second service instance generates a reply message to return to the client during processing the message, the reply message having the session ID and endpoint ID; and
the second service instance stores the reply message in the write data store, the reply message grouped with other messages having the session ID such that messages for the duplex client component are grouped together in the write data store.

9. The method as recited in claim 8, wherein:
a third duplex service component queries the write data store for messages having the session ID, the third duplex service component querying the write data store in response to a received poll message from the duplex client component, the received poll message having the session ID;
the write data store returns one or more messages grouped together by the session ID to the third duplex service component, the one or more messages including the reply message; and
the third duplex service component sends the one or more messages grouped together by the session ID to the duplex client component in response to the poll.

10. The method as recited in claim 9, wherein the first duplex service component and the third duplex service component are the same duplex service component.

11. The method as recited in claim 9, further comprising wherein one or more messages having the session ID are written to the write data store subsequent to the act of the third duplex service component querying the write data store for messages, and wherein sending the one or more messages grouped together by the session ID comprises sending at least one of the one or more messages.

12. The method as recited in claim 1, further comprising:
an act of receiving, at the first duplex service component, a poll message from the duplex client component, the poll message requesting application messages for one or more clients that are in duplex communication with the duplex client component, the poll message having been routed from the duplex client component to the first duplex service component using the request/reply communication protocol, the poll message including the session ID assigned to the duplex client component;
an act of the first duplex service component checking a write data store for any application messages having the session ID assigned to the duplex client component;
an act of the first duplex service component locating in the write data store at least one application message having the session ID assigned to the duplex client component, the at least one message having been written to the write data store by the first service instance using duplex communication; and
an act of the first duplex service component sending the application message to the duplex client component using the request/reply communication protocol.

13. The method as recited in claim 12, wherein the act of the first duplex service component locating in the write data store at least one application message having the session ID assigned to the duplex client component comprises an act of the first duplex service component locating in the write data store a plurality of application messages having the session ID assigned to the duplex client component.

14. The method as recited in claim 13, wherein the act of the first duplex service component locating in the write data store a plurality of application messages having the session ID assigned to the duplex client component comprises an act of the first duplex service component locating at least one other message having been written to the write data store by the second service instance, the at least one message having the session ID.

15. The method as recited in claim 14, further comprising:
an act of the first duplex service component batching the plurality of applications together in a batch of messages;
wherein the act of sending the application message to the duplex client component comprises an act of sending the batch of messages to the duplex client component.

16. The method as recited in claim 15, further comprising:
an act of writing one or more messages having the session ID being to the write data store subsequent to the first duplex service component querying the write data store for messages;
wherein the act of sending the batch of messages comprises an act of sending at least one of the one or more messages.

17. A computer program product comprising one or more recordable-type computer-readable storage devices having stored thereon computer-executable instructions that, when executed by one or more processors of a computer system, cause the computer system to implement a method for storing messages for access by designated service instances, the method comprising:
an act of receiving, at a first duplex service component of a first computer system, a message from a duplex client component, the message having been sent from a client of one or more clients to the duplex client component using a duplex communication protocol, and having been routed from the duplex client component to the first duplex service component using a request/reply communication protocol, the duplex client component having converted the message for request/reply communication, including attaching a session ID corresponding to the duplex client component to the message and attaching an endpoint ID corresponding to the client to the message;
an act of the first duplex service component determining that a first service instance of the first computer system is not processing messages with the attached session ID, and that the message is therefore not intended for the first service instance; and
an act of the first duplex service component storing the message in a read data store in response to the determination, so as to make the message available to another service instance at another computer system, the message being grouped in the read data store with other messages having the same session ID and endpoint ID, such that messages from the same clients are grouped together within the read data store;
wherein a second service instance of a second computer system accesses the message from the read data store, the second service instance accessing the message based on the message having a session ID and endpoint ID corresponding to the duplex client component and the client, respectively.

18. A computer system for storing messages for access by designated service instances, comprising:

one or more processors; and one or more computer-readable media having stored thereon computer-executable instructions that, when executed by the one or more processors, cause the computer system to perform the following:

receive, at a duplex service component of the computer system, a message from a duplex client component, the message having been sent from a client of one or more clients to the duplex client component using a duplex communication protocol, and having been routed from the duplex client component to the duplex service component using a request/reply communication protocol, the duplex client component having converted the message for request/reply communication, including attaching a session ID corresponding to the duplex client component to the message and attaching an endpoint ID corresponding to the client to the message;

determine, at the duplex service component, that a service instance of the computer system is not processing messages with the attached session ID, and that the message is therefore not intended for the service instance of the computer system; and store the message in a read data store in response to the determination, so as to make the message available to another service instance at another computer system, the message being grouped in the read data store with other messages having the same session ID and endpoint ID, such that messages from the same clients are grouped together within the read data store;

wherein the other service instance of the other computer system accesses the message from the read data store, the other service instance accessing the message based on the message having a session ID and endpoint ID corresponding to the duplex client component and the client, respectively.

\* \* \* \* \*